United States Patent [19]

Hiller

[11] 3,717,765

[45] Feb. 20, 1973

[54] DEVICE FOR NON-DESTRUCTIVE CONSUMPTION TESTING OF REACTOR FUEL ELEMENTS

[75] Inventor: Sigwart Hiller, Lauf, Germany

[73] Assignee: Siemens Aktiengesellschaft, Berlin and Munich, Germany

[22] Filed: March 30, 1971

[21] Appl. No.: 129,537

[30] Foreign Application Priority Data

April 4, 1970 Germany.................P 20 16 206.5

[52] U.S. Cl.............250/83.3 R, 250/83.1, 250/105
[51] Int. Cl.............................G01t 1/16, G01t 1/24
[58] Field of Search..250/83 R, 83.1, 83.3 R, 83.3 D, 250/105, 83.6 FT

[56] References Cited

UNITED STATES PATENTS 2,911,343  11/1959  Braffort et al...................250/83.1 X
3,430,044  2/1969   Briffaud..........................250/83.3 D
3,487,218  12/1969  Krebs et al. ....................250/105
3,612,869  10/1971  Baum et al....................250/83.3 R X Primary Examiner—Archie R. Borchelt
Attorney—Curt M. Avery, Arthur E. Wilfond, Herbert L. Lerner and Daniel J. Tick

[57] ABSTRACT

Apparatus for the non-destructive consumption testing of nuclear fuel elements in a basin includes inserting at least one gamma ray collimator through the wall of the basin and having one end thereof connected to a gamma spectrometer. The other end of the collimator is coupled to a water evacuated tube connected with the guide structure of the fuel element being tested. The fuel element is vertically moved past the collimator so that the consumption state of the element can be tested.

10 Claims, 3 Drawing Figures

DEVICE FOR NON-DESTRUCTIVE CONSUMPTION TESTING OF REACTOR FUEL ELEMENTS

My invention relates to a device for non-destructive consumption testing of nuclear reactor fuel elements, the testing including the use of a gamma ray spectrometer of high-resolving power.

Determining the amount of consumption of nuclear fuels present in the fuel elements of nuclear reactors is of great importance for economical operation of nuclear power plants. Since the power distribution in the reactor core of each reactor system is not homogenous, either in the horizontal or vertical directions and may have considerable variation therealong, the fissionable material within the fuel elements is non-uniformly utilized, and the consumption of the material may also be non-uniform.

To obtain a better utilization and more uniform consumption of the fuel, it is known to exchange a part of the less loaded fuel element from the outer zone of the reactor core for a more highly loaded fuel element from the central zone. This exchange process can be accomplished with maximum effectiveness when the consumption ratios in the fuel elements which are to be exchanged can be quickly and non-destructively determined. This non-destructive consumption testing is of obvious importance for the fuel elements, which in the process are completely removed from the reactor core.

There are many possible ways to perform such non-destructive consumption testing. Thus, it is possible, in principle, to measure calormetrically the quantity of heat carried by the coolant in the reactor from a specific part of the reactor core while the reactor is operating. This type of measurement is not exact, however, and yields only average values and fails to provide specific consumption measurements relating to specified portions of the core.

In laboratory tests to determine the non-destructive consumption of fuel probes or individual fuel rods (see Nuclear Materials Management, pp. 829–849, Vienna 1966, and Atomic Core Energy 14–63 (333–341), 1969), the measurement of the $\gamma$ activity of specified fission materials with a high resolution semiconductor diode of lithium-drifted germanium (often used in $\gamma$ spectroscopy) was found effective. It is most difficult to extend this method to a larger device, such as a fuel element, which, generally, comprises several hundred individual fuel rods. The non-homogenous consumption distribution within the fuel element, coupled with the questionable absorption of the $\gamma$ ray in the rod bundle and the difficult geometrical proportions do not permit a correlation to be made between the $\gamma$ ray emitted to the outside and the average consumption of the fuel element comprising the many rods.

Based on this known measuring method with a high-resolution Ge(Li) semiconductor diode, BÜKER (see Nucleonic 9 346–351, 1967) developed an automatic device for testing the consumption of spherical fuel elements of a reactor designed for such elements. The device removes spheres from the fuel cycles which have exceeded a specific fuel consumption limit. This method confirms that it is possible to obtain information concerning the average consumption of the individual measured spheres and not be limited to measurements of only the complete fuel element.

An object of my invention is to provide a device which performs a rapid and non-destructive consumption testing of individual fuel elements within a nuclear reactor, particularly for determining the consumption distribution in the longitudinal direction thereof.

Another object of my invention is to provide such a device which is capable of producing useful data for controlling the utilization of the fuel element.

Still another object of my invention is to provide such a device which is very safe and prevents stray nuclear radiation.

Other objects, advantages and features of this invention will become more apparent from the following description.

In accordance with the principles of my invention, the above objects are accomplished by providing a device for non-destructive consumption testing of nuclear reactor fuel elements in a fuel element decay basin with a high-resolution gamma spectrometer comprising a guide structure vertically supported in the basin and being capable of receiving a nuclear fuel element to be tested over its entire length by moving the fuel element past at least one gamma radiation spectrometer located behind the wall of the basin through which a collimator is placed to enable the spectrometer to receive the radiation of the fuel element.

As a further feature of my invention, a tube is provided which is free of water and is positioned in coaxial relation to the collimator, between the inner basin lining which covers the front opening of the collimator and the guide structure. This prevents additional radiation absorption in the basin water, between the radiation source (the fuel element being tested) and the collimator.

The radiation of individual fuel rods may be scanned with this device. This is particularly advantageous with fuel elements having rectangular cross-sections, which are generally used in nuclear reactors. With my invention it is very simple to scan the corner fuel rods of the fuel elements in such reactors and turn off the radiation of adjacent fuel rods. For testing such fuel elements, it is preferable that the lateral faces of the elements terminate at an angle of 45° with respect to the collimator axis, and that the collimator axis be directed toward a corner fuel rod of the fuel element. In such cases, it may also be advantageous to employ two measuring directions, comprising respective collimators and the spectrometers, and in this manner, simultaneously scan two diagonally opposed corner fuel rods. From the obtained knowledge of consumption distribution in individual fuel rods, the respective consumption data in the entire fuel element can be derived.

The above-mentioned and other objects, advantages and features of my invention, said features being set forth with particularity in the claims annexed hereto will be apparent from, and will be mentioned in, the following description of embodiments of the invention illustrated by way of example in the accompanying drawings in which:

Figure 1:
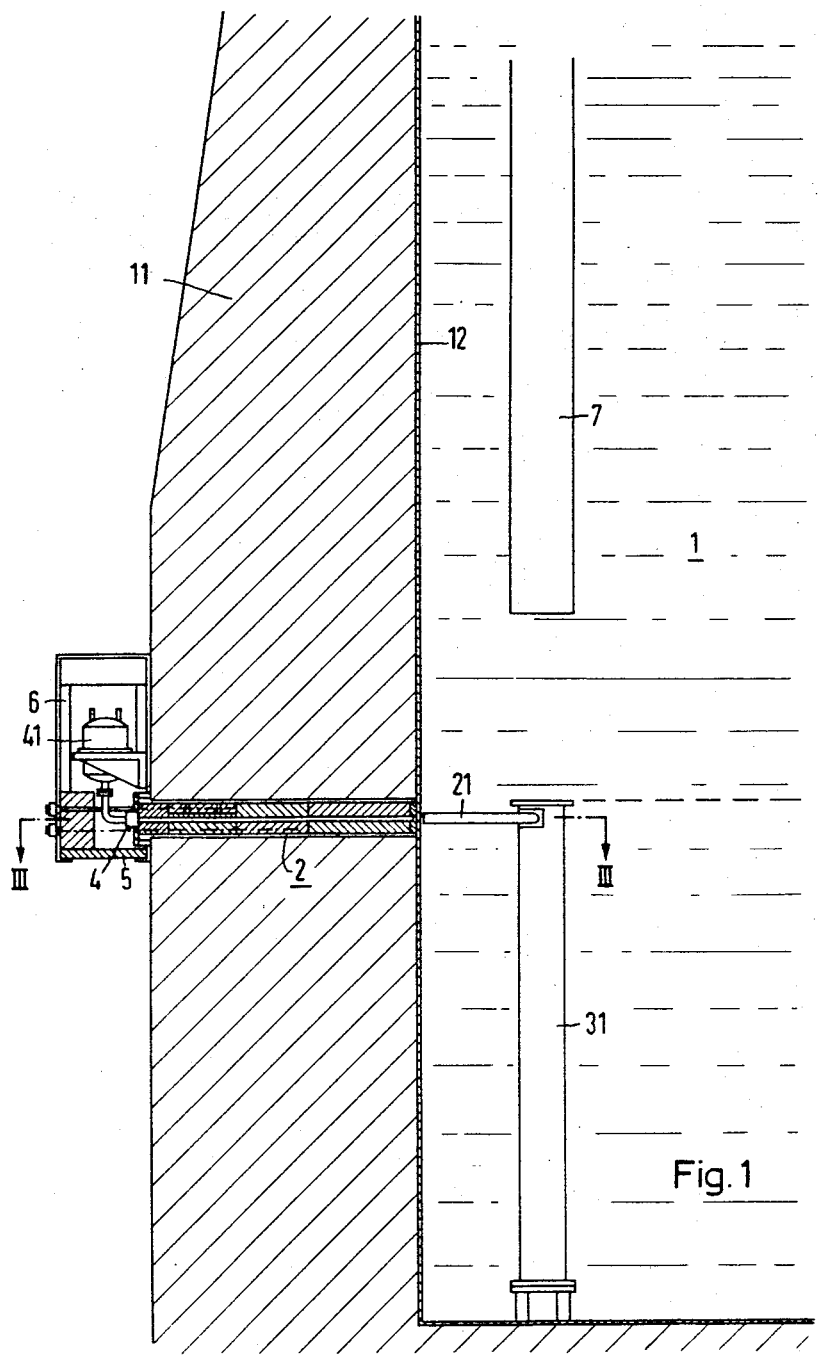
FIG. 1 is a longitudinal sectional view through a decay basin of a nuclear reactor plant with an embodiment of my invention installed therein.

Referring to the drawings, and in particular to FIG. 1, there is shown a fuel element decay basin of a nuclear reactor which is filled with water and is located proximate to the actual core reactor. The fuel elements taken from the core reactor may be transported across this basin by a loading machine 7 and deposited on the bottom of a fuel element guide structure 31. Only following the decay of the short-lived nucleides, are the spent fuel elements removed from the structure, which may be further transported from the nuclear reactor. However, the fuel elements, which are to be continually used in the reactor core, are first tested in the device according to my invention for the amount of consumption undergone and are reemployed accordingly in other fuel element positions in the reactor core.

This device comprises the guide construction 31 resting on the bottom of the decay basin 1, the guide 31 having the same height as the fuel elements structure, not shown here for purposes of clarity. The loading machine 7 or other suitable apparatus moves the fuel elements to be tested past the measuring instrument. The reactor core is provided with a basin wall 11 having an inner lining 12 for the basin 1. An opening is bored through the wall 20 terminating at the inner lining 12 at the level facing the top end of the guide structure 31. A collimator 2 portion of the measuring apparatus is inserted through this opening and terminates at the inner lining 12 on one end and at a gamma spectrometer on the other end of the opening. So that the radiation to be measured in the gamma spectrometer 4 is not made weaker as a result of absorption by the water in the decay basin, the radiation is guided, within the basin, in a closed tube 21 which is free of water. One end of this tube 21 is, preferably, rigidly connected to the guide construction 31, while the other end terminates adjacent to but not touching lining 12. To adjust the datum position of the fuel rod to be measured, the height of the guide construction may be adjusted within suitable limits.

Figure 2:
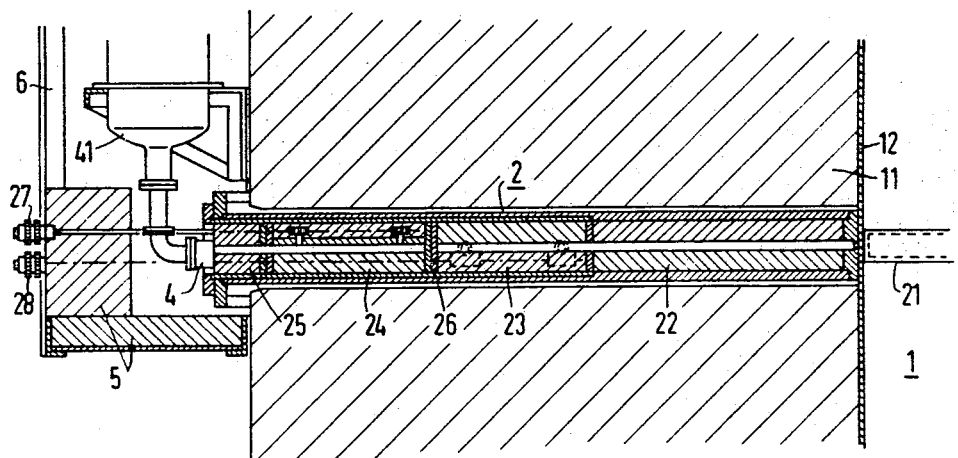
FIG. 2 is an enlarged sectional view taken through the measuring device of my invention including a gamma radiation spectrometer and collimator.

As shown more clearly in FIG. 2, the cross-sectional area of the radiation channel in the opening through wall 11 may be adjusted by adjustable diaphragms 22, 23, 24 and 25, made of lead, controlled by adjusting means 27 and 28. The adjusting mechanism 27 and 28 is coupled to and controlled from outside the rear shielding of the basin. In an illustrative embodiment, the diaphragms 22 and 25 are fixed and have a channel opening of, e.g., 25 × 45 mm., and the intermediate diaphragms 23 and 24 may be readjusted through the adjusting means between 0 and 40 mm. and 0 and 20 mm., respectively. Situated between the diaphragms 23 and 24 is a rigid diaphragm 26 of plexiglass for shielding possible $\beta$ radiation. The tubular collimator is rigidly embedded in the opening of the basin wall 11. A Ge(Li) diode 4 and associated apparatus, such as, for example, a storage container with liquid nitrogen 41, the ion gettering pumps for supplying voltage supply (not illustrated), the load-sensitive pre-amplifier and the other electrical means which form the spectrometer arrangement are located outside the basin wall 11 and communicate with the collimator 2. The spectrometer is well known and is, therefore, not disclosed in greater detail.

The illustrated cross-sectional area chosen for the collimator 2 enables an always reproducible volume of radiation to be produced by the fuel rod being measured. In addition, the shielding prevents high radiation loads to occur on the operational side of the collimator.

Figure 3:
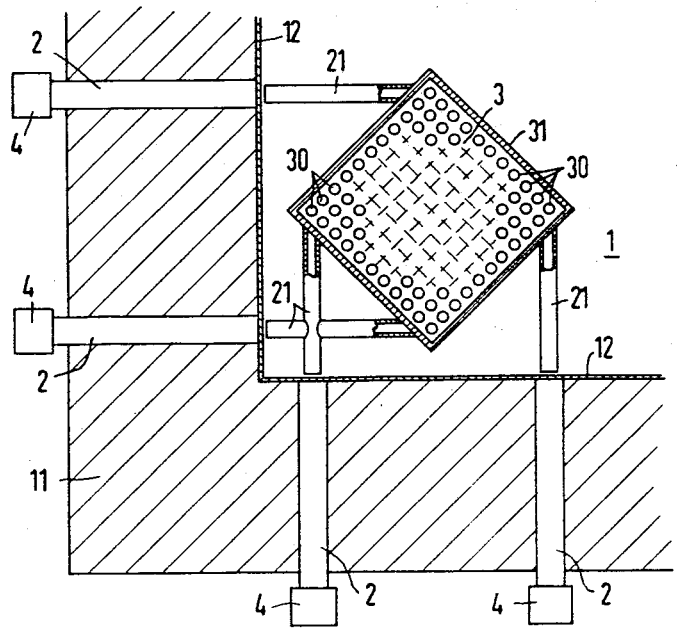
FIG. 3 is a sectional view of the measuring device taken along through this device, line III—III of FIG. 1, where simultaneous scanning of four diagonally opposed corner fuel rods of a square fuel element is illustrated.

Referring to FIG. 3, it is possible when using fuel elements with rectangular cross-section, to measure simultaneously two corner fuel rods 30, or by arranging the guide structure 31 in one corner of the fuel element decay basin, to measure simultaneously all four corner fuel rods 30. It is also possible to arrange the collimators 2 not in parallel as shown in FIG. 3, but directed obliquely to the fuel rods 30 to be measured, if necessary in the interest of space. FIG. 3 illustrates also the guide structure 31 to which the four tubes 21 are welded.

In an illustrative embodiment, the decay basin has a depth of 11 m, and the thickness of the outer walls 11 is 1.8 m. The collimator 2, whose diameter is approximately 20 cm, will have a corresponding length of 1.8 m.

When two or more spectrometer arrangements are simultaneously used, it is possible not only to simultaneously measure fuel rods which are variously positioned in the fuel element but also to effect differential measurements by connecting the outputs of these spectrometers in a subtractive relationship. This provides immediate information regarding the consumption differences, perpendicularly to the longitudinal axis of the fuel element.

To those skilled in the art, it will be obvious from a study of this disclosure that our invention permits of various modifications and may be given embodiments other than particularly illustrated and described herein, without departing from the essential features of the invention and within the scope of the claims annexed hereto.

I claim:

1. A device for non-destructive consumption testing of nuclear reactor fuel elements in a fuel element decay basin wherein said decay basin has a wall comprising a gamma spectrometer, a gamma radiation collimator, said wall having a through-hole in which said collimator is positioned, said spectrometer communicating with one end of said collimator, a guide structure vertically disposed in said basin for holding the fuel element to be tested, said fuel cell being moved past the other end of said collimator, said collimator being directed towards said fuel element.

2. A device as claimed in claim 1, wherein said through-hole terminates in said wall approximately at the top of said guide structure.

3. A device as claimed in claim 2, comprising a water-evacuated tube connected to said guide structure and being directed towards said collimator, said tube preventing absorption of radiation in the water in the basin.

4. A device as claimed in claim 3, wherein said tube is axially aligned with said collimator.

5. A device as claimed in claim 3, wherein said fuel element is rectangular in cross-section, the sides of said fuel element being supported by said guide structure to be at approximately a 45° angle with respect to the axis of said collimator, said collimator being directed towards a corner fuel rod in said element.

6. A device as claimed in claim 5, comprising at least two collimators and respective gamma spectrometers, said two collimators located in said wall and being directed toward the fuel element perpendicularly to each other, said two collimators being at the same height with respect to said basin and being directed toward different corner fuel rods of said fuel element.

7. A device as claimed in claim 6, comprising at least two water-evacuated tubes coaxial with respective ones of said two collimators.

8. A device as claimed in claim 1, wherein said collimator is provided with diaphragm means for adjusting the cross-sectional area of said collimator, said collimator being embedded in said wall.

9. A device as claimed in claim 1, comprising means for vertically moving said fuel element past said collimator.

10. A device as claimed in claim 1, wherein said gamma spectrometer includes a lithium drifted germanium diode.

* * * * *